United States Patent [19]

Norris

[11] 4,041,496
[45] Aug. 9, 1977

[54] AUTOMATIC DIRECTION FINDING SYSTEM

[76] Inventor: Paul R. Norris, P.O. Box 925, Issaquah, Wash. 98027

[21] Appl. No.: 680,203

[22] Filed: Apr. 26, 1976

[51] Int. Cl.² ............................................. G01S 5/02
[52] U.S. Cl. ........................ 343/113 DE; 343/100 SA
[58] Field of Search ............... 343/113 DE, 100 SA, 343/854, 115, 118, 106 D

[56] References Cited

U.S. PATENT DOCUMENTS

| | | | |
|---|---|---|---|
| 3,121,871 | 2/1964 | Beukers | 343/113 DE |
| 3,503,071 | 3/1970 | Earp | 343/113 DE |
| 3,806,930 | 4/1974 | Gobert | 343/854 |

*Primary Examiner*—Maynard R. Wilbur
*Assistant Examiner*—T. M. Blum
*Attorney, Agent, or Firm*—Seed, Berry, Vernon & Baynham

[57] ABSTRACT

An automatic direction finding system utilizing the doppler principle for indicating the bearing of a radio transmission. The system includes an antenna array of three or more antenna elements equally spaced around a circular path. The antenna elements are connected to the input of a receiver through electronically controlled, variable attenuators which are individually adjusted at the same frequency but differing phases so that the array effectively simulates a single antenna element physically moving along a circular path at a fixed modulation frequency. The receiver includes a mixer-IF stage with the IF output phase locked to a reference frequency so that the absolute time delay through the IF stage is stabilized. The signal is then frequency demodulated, and the modulation signal is extracted by a narrow bandpass commutating filter. The phase of the modulation signal is then compared to the phase of the signal controlling one of the variable attenuators to produce a direction indication proportional thereto.

21 Claims, 11 Drawing Figures

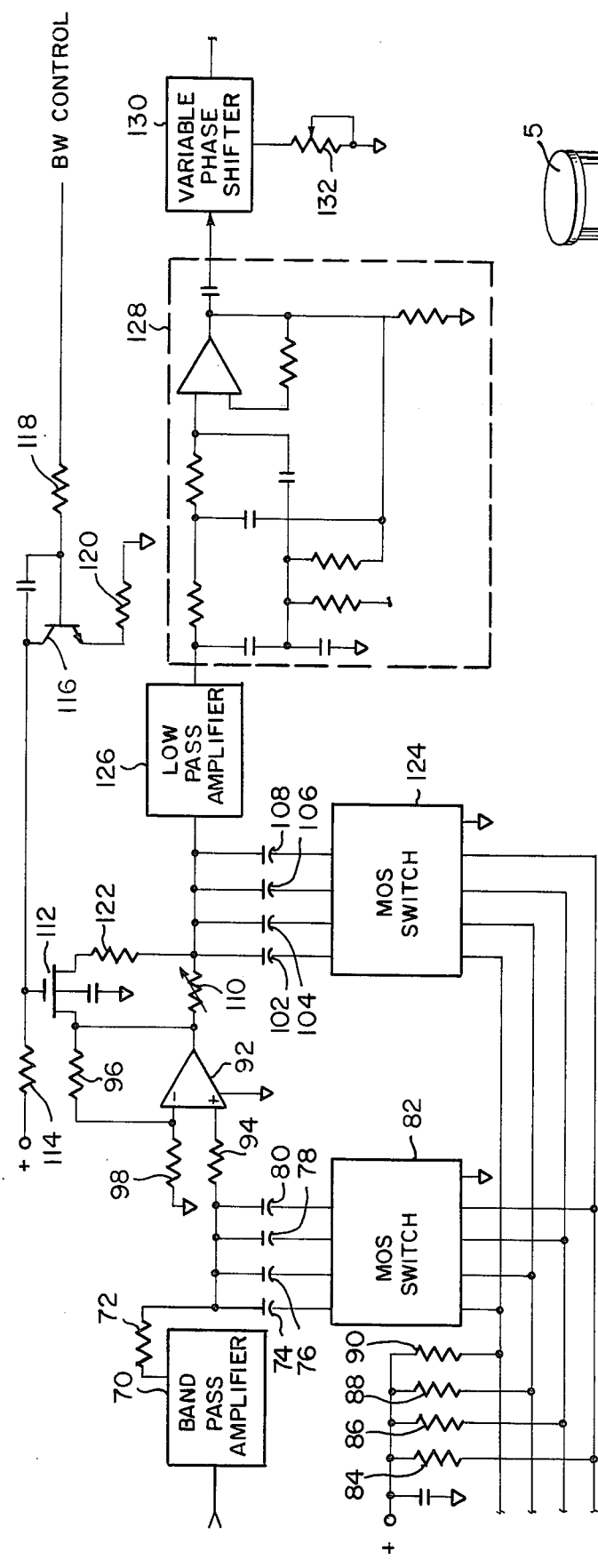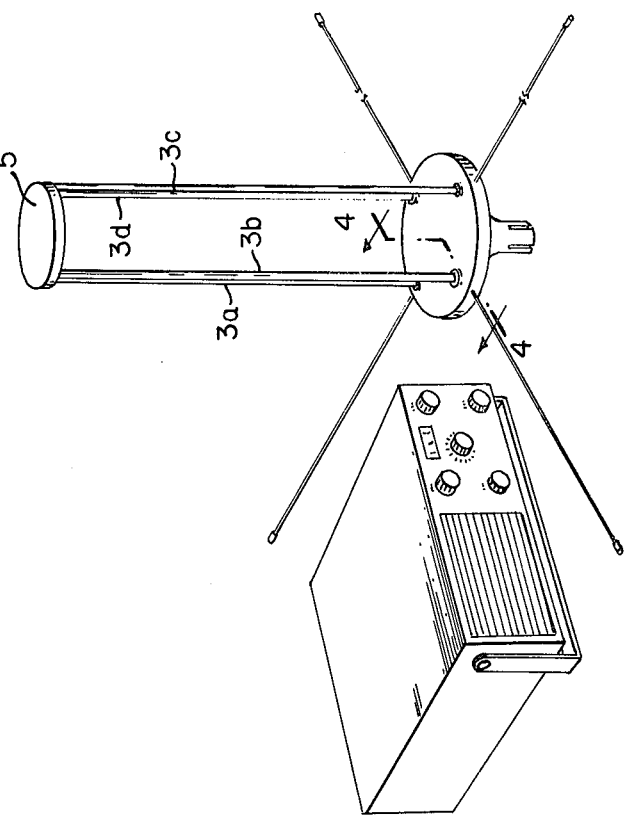
FIG. 3
FIG. 1

AUTOMATIC DIRECTION FINDING SYSTEM

BACKGROUND OF THE INVENTION

1. Field of the Invention

This invention relates to automatic direction finding systems and, ore particularly, to an automatic direction finding system utilizing the doppler principle by which an antenna is electrically circulated around a circular path thereby frequency modulating the transmitted signal such that the phase of the modulating signal indicates the bearing of the radio transmission.

2. Description of the Prior Art

Radio direction finding has long been used by aircraft and marine services as an aid for location and navigation purposes. Most radio direction finding systems utilize some form of highly directive antenna. In these systems, directional information is obtained by relative amplitude comparisons as the antenna is rotated. The gain patterns for most of these antennas include a peak and a null, but since the null response is generally much narrower than the peak response the null response is preferred since it is capable of providing more accurate directional information. Earlier systems required manual rotation of the antenna and considerable operator skill to avoid erroneous results. With conventional systems, rotation of the antenna is normally simulated by vectorially resolving the outputs of two directional antennas mounted in quadrature relationship to one another. An omnidirectional antenna can be combined with the two directional antennas to generate an antenna having a cardioid pattern. Under optimum conditions, these conventional audio direction finding systems can provide satisfactory results. However, under less than optimum conditions a number of problems develop. Where these conventional systems are used near reflective land masses or other obstruction, the incoming signal is reflected by the land mass or obstruction so that a plurality of signals arriving at different bearings are received by the direction finding antenna. This condition, commonly called multipath, effectively distorts the sensitivity pattern of the direction finding antenna often producing several relatively indistinct nulls. The results under these conditions are generally both confusing and ambiguous.

Another problem associated with conventional automatic direction finding systems utilizing a null antenna occurs under weak signal conditions. In these circumstances, as the null in the pattern is approached the signal drops beneath the sensitivity of the receiver thereby effectively broadening the width of the null and consequently limiting the resolution of the system on weak signals. Another problem associated with this type of conventional system where the antenna is rotating at an audio frequency is that the amplitude variations in the antenna pattern amplitude modulate the incoming signal thereby injecting an audio tone in the received signal. This is particularly troublesome during search and rescue operations where identification and bearing are both important.

Another variety of automatic direction finding system which utilizes the doppler principle avoids many of the above mentioned problems associated with conventional systems utilizing null antennas. In automatic direction finding systems utilizing the doppler principle, a single receiver antenna circulates at a constant speed along a circular path. As the antenna approaches the source of the received signal, the apparent frequency of the received signal is increased, and when the receiver antenna moves away from the source of the received signal, the apparent frequency of the received signal is decreased. Where the frequency of the received signal is equal to the average frequency of the signal, the antenna is at its closest and farthest distances from the source of the received signal. By noting the position of the antenna as the frequency of the received signal crosses over from an above average frequency to a below average frequency, the bearing of the radio transmission can be determined. Practical designs for doppler automatic direction finding systems do not mechanically rotate the antenna since the velocity required to place the doppler component above the communication audio spectrum is quite large. For example, a velocity of 240,000 revolutions per minute is required to generate a doppler component of 4Khz. Instead of mechanically rotating the antenna, practical systems utilize a circular fixed array of vertical antenna elements. The doppler modulation signal is provided by sequentially connecting the receiver to successive antenna elements, generally by means of a capacity switch. It has been universally assumed in the past that many antenna elements were required in order to approximate a single antenna moving along a circular path. Decreasing the number of antenna elements, it was reasoned, would seriously decrease system accuracy. As a result of this reasoning, conventional doppler systems contain a relatively large number of antenna elements which materially increases the cost and complexity of such systems. Despite the disadvantages of cost and complexity of these conventional doppler systems, they have been relatively successful in eliminating the aforementioned problems associated with systems using a null antenna. Since the field pattern of the doppler antenna is relatively omni-directional, the received signal is not amplitude modulated by the electrical rotation of the antenna. The multipath problem is eliminated by the "capture effect" of FM receivers which are used in connection with the doppler antenna. Under most conditions, the direct wave is stronger than the deflected or reflective waves. The FM receiver locks onto the strongest signal and suppresses the weaker signals. Thus conventional doppler systems are somewhat more expensive and complex than null systems but they provide superior results.

SUMMARY OF THE INVENTION

It is an object of this invention to provide an automatic direction finding system utilizing the doppler principle which is substantially less expensive and complex than prior art doppler systems.

It is another object of this invention to provide a doppler direction finding system having an audio output which is substantially free of interference from the doppler modulation component.

It is another object of this invention to stabilize the time delay of the doppler component passing through the IF filter so that a phase comparison between the doppler component and a reference signal does not vary as the frequency of the transmitted signal is varied.

It is still another object of this invention to place the doppler component on the received signal with a relatively low modulation index so that the doppler signal does not degrade the audio quality of the received signal and the received signal does not substantially deviate from the center portion of the FM discriminator where its response is relatively linear.

It is a still further object of the invention to provide an antenna array for a doppler direction finding system which utilizes relatively few antenna elements, which has a relatively constant driving point impedance and which may be electrically rotated with substantially amplitude modulating the received signal.

These and other objects of the invention are accomplished by a doppler automatic direction finding system utilizing an antenna array of at least three antenna elements spaced apart along a circular path. The spacing between the elements is substantially less than one quarter of a wavelength in order to minimize beam-forming effects which would cause the antenna pattern to become less omni-directional resulting in amplitude modulation of the received signal as the antenna is electrically rotated. The antenna elements are summed at a receiver input through respective electronically controlled, variable attenuators which sequentially and gradually connect successive antenna elements to the receiver input so that the antenna array simulates a single antenna moving along the circular path. The doppler component is injected onto the received signal at a relatively low modulation index. The omni-directional characteristics of the antenna, coupled with the low modulation index, prevents the doppler component from unduly degrading the audio quality of the received signal so that the information portion of the received signal is readily recognizable. The doppler component may be reduced further by passing the audio signal through a notch filter centered at the frequency of the doppler components. The relatively low amplitude doppler component is extracted by a narrow bandpass commutating filter to produce a very clean doppler modulation signal. One of the signals controlling the variable attenuators is selected as a fixed bearing reference, and the phase of this reference signal is compared to the phase of the doppler modulations signal to provide a bearing indication with respect to a fixed reference. The front end of the receiver is time delay stabilized by phase locking the IF output to a fixed reference frequency so that the doppler component of the received signal always passes through the same portion of the IF filter.

BRIEF DESCRIPTION OF THE FIGURES OF THE DRAWING

FIG. 1 is an isometric view of the electrically rotatable antenna array which is utilized to doppler modulate the received signal and the FM receiver which provides a visual indication of the bearing of the radio transmission.

FIG. 3 is a schematic of a commutating filter used as the variable bandwith tracking filter in the FM receiver of FIG. 1.

DETAILED DESCRIPTION OF THE INVENTION

As mentioned above, conventional wisdom holds that a large number of antenna elements are necessary for a doppler antenna to closely approximate a single antenna element moving along a circular path. Under this theory, it is generally accepted that the accuracy obtainable is directly related to the number of antenna elements in the antenna array. This assumption can, however, be shown to be false by application of the bandpass sampling theorem. This theorem states that the sample rate required to obtain all the information necessary to reconstruct the original spectrum is equal to two to four times the information bandwidth.

Mathematically: $2B \leq f_s \leq 4B \ldots (15)$ where $f_s$ is the sample rate and B the information bandwidth. The actual minimum sampling rate which is greater than twice, but less than four times, the information bandwidth is related to aliasing considerations and can be found by a somewhat complex formula. The significant point to note is that the sampling rate required for complete recovery of the spectrum is, except for aliasing considerations, dependent only on the width of the information band, and it is independent of the center frequency of the information band. For the case of a rotating antenna, one rotation of the antenna in one second results in one cycle of information. The information bandwidth B equals one hertz. The maximum sampling rate (number of samples per cycle of information bandwidth) is 4B. Thus it may be concluded that no more than four elements placed in a circle will meet both sampling and aliasing criteria for recovery of the original spectrum and that under special conditions a sampling rate of 3B is possible using only three antenna elements.

Figure 2:
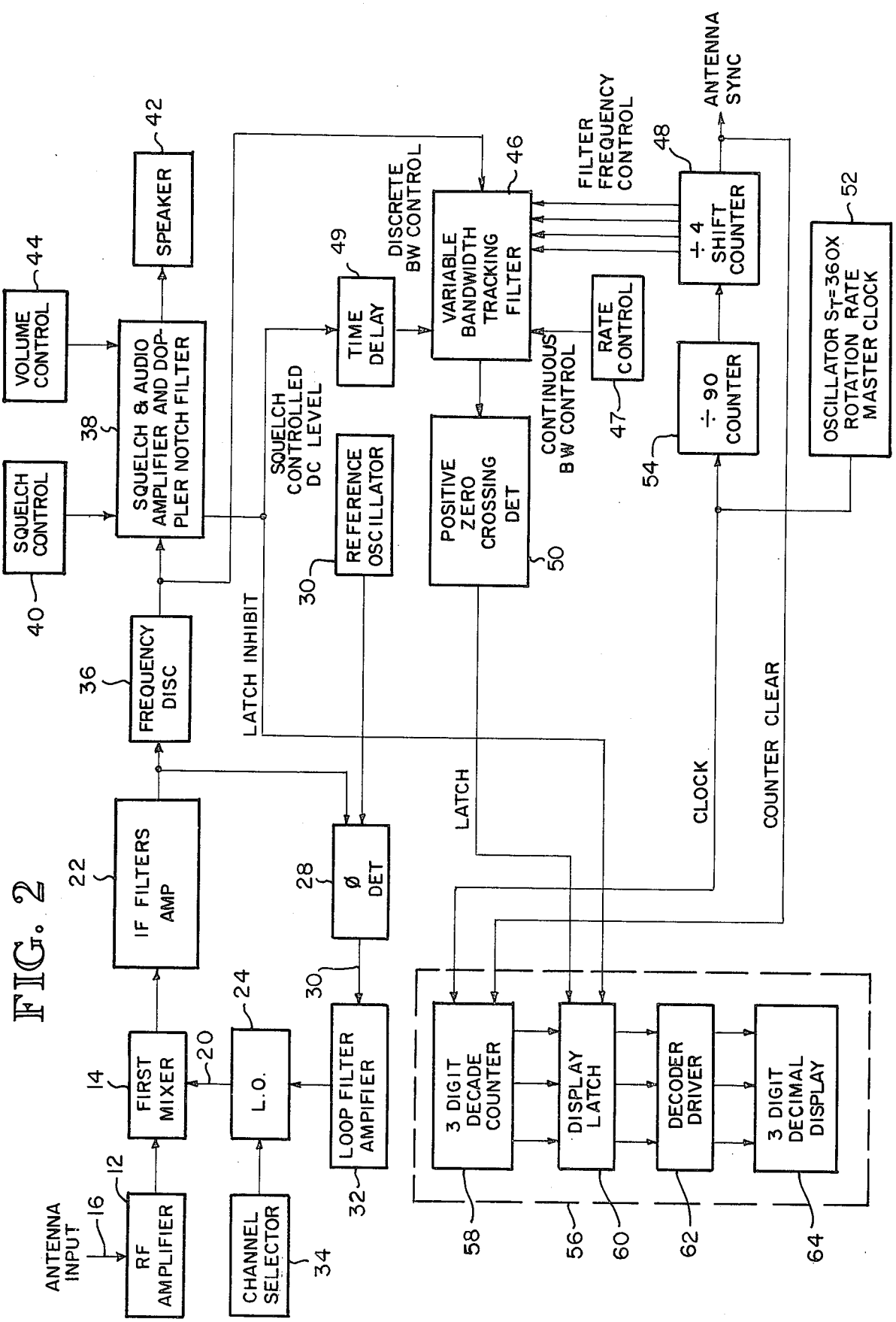
FIG. 2 is a block diagram of the FM receiver for generating a visual indication of the bearing of a radio transmission and for broadcasting the transmission over an audio speaker.

The direction finding system as illustrated in FIG. 1 includes an antenna array 1 and a receiver 2. The antenna array includes only four antenna elements 3 extending between a base housing 4 and top plate 5. Four ground plane elements 6 extend in a radial direction from the housing 4. The receiver includes a bearing indicator 7, and audio speaker 8 and a number of control knobs, indicated generally at 9. The block diagram for the receiver 2 is illustrated in FIG. 2.

The antenna input to the receiver contains the transmitted signal with the addition of the doppler modulation signal having a frequency corresponding to the rotational frequency of the antenna array. The amplitude of the signal at the antenna input is boosted by a conventional RF amplifier 12 and applied to a conventional mixer 14 which generates a signal on its output line which is the sum and difference of the signals at the two input lines. The output of the mixer 14 passes through an IF filter-amplifier stage 22 which has a relatively narrow passband. The IF filter-amplifier stage 22 selects a predetermined frequency difference on the input lines to the first mixer 14 so that the frequency of the received signal at the antenna input 10 can be selected by adjusting the operating frequency of a local oscillator 24. The IF filter stage 22 passes those frequencies falling within the IF filter passband but it also introduces a time delay. The magnitude of the time delay is difficult to accurately predict and it varies depending where in the passband the signal appears. Signals having a frequency falling toward the edges of the pass band generally undergo a longer delay. Conventional narrow band FM communication receivers generally place a frequencly lock loop around the IF filter stage to assure that the received signal passes through the center 70 to 80% of the IF filter passband where the phase characteristics of the filter are relatively linear. The generally accepted reason for this procedure is to minimize group delay distortion which becomes quite large near the edges of the IF filter passband. In the direction finding system of FIG. 2, phase locking is used instead of frequency locking since it provides more accurate frequency control. However, the frequency control is not used to minimize group delay distortion as in conventional receivers since this is only of secondary importance. Of primary importance is the stabilization of the absolute time delay imparted to the doppler modulation. In other words, the system insures that the doppler modulation always passes through substantially the same point in the IF filter passband and hence undergoes a relatively constant time delay regardless of the frequency of the transmitted signal. As explained hereinafter, while absolute time delays can be compensated for, variations in time delay produce bearing errors which cannot be compensated for. The output of the IF filter-amplifier stage 22 is applied to a phase detector 28 which produces a signal on its output line 30 which is proportional to the difference in phase between the output of the IF filter-amplifier stage 22 and the signal at the output of a reference oscillator 30. The output of the phase detector 28 is applied to a loop filter-amplifier 32 which establishes the loop dynamics. The frequency modulation of the received signal is generally between 300 and 3,000 Hz with a 4 Khz doppler modulation. Since the loop filter-amplifier has a relatively low cutoff frequency, for example 15 Hz, the loop is unable to respond to the modulation frequencies, but instead only responds to long term variations in frequency so that the average frequency at the output of the IF filter-amplifier stage 22 is substantially constant. The frequency of the received signal is determined by the local oscillator 24 which operates at a frequency which is manually adjustable over a wide range by a channel selector 34 which may be, for example, a plurality of crystals selectively switched into a conventional crystal oscillator circuit. The operating frequency of the local oscillator 24 is also automatically adjustable over a relatively small range by the voltage at the output of the loop filter-amplifier 32. After a predetermined channel has been selected by the channel selecter 34, average frequency deviations at the output of the IF filter-amplifier stage 22 from the frequency of the reference oscillator 30 produce a signal at the output of the phase detector 28 which is amplified and integrated by the loop filter-amplifier 32 to provide a control voltage to the local oscillator 24 which increases or decreases its operating frequency so that the average frequency at the output of the IF filter-amplifier stage 22 is identical to the operating frequency of a reference oscillator 30.

The output of the IF filter-amplifier stage 22 is received by a frequency discriminator 36 of conventional design such as a ratio detector which produces a voltage proportional to the frequency of the input signal. Since the audio signal frequency modulates the transmitted signal, the signal at the output of the frequency discriminator 36 is identical to the audio signal at the transmitter with the addition of the doppler modulation injected by the antenna. The signal at the output of the frequency discriminator 36 is applied to a squecl-audio amplifier and notch filter 38 which is of conventional design. The amplifier 38 amplifies the audio signal at the output of the frequency discriminator 36 and includes an adjustable threshold set by the squelch control 40 which disables the amplifier 38 for audio input signals below the level set by the squelch control 40. The output of the amplifier 38 drives a loud speaker 42 at a volume set by the volume control 44. The amplifier 38 also contains a notch filter for removing the doppler modulation from the audio signal so that the doppler modulation does not unduly interfere with the quality of the audio signal broadcast through the speaker 42. Unlike prior art doppler automatic direction finding systems, the modulation index of the doppler modulation in the inventive system is relatively low so that the intensity ratio of the doppler modulation to the audio signal is relatively small, and thus the remaining doppler modulation is easily removed by the notch filter in the audio amplifier 38.

The output of the frequency discriminator 36 is also applied to a variable bandwidth tracking filter 46 which has a very narrow passband centered at the frequency of the doppler modulation so that only the doppler modulation signal appears at the output of the filter 46. Although various filter designs may be used for the tracking filter 46, the narrow bandwidth and variable center frequency of a commutating filter is an ideal implementation of the tracking filter 46. As explained hereinafter, the commutating filter includes four commutating switches sequentially actuated by signals from a divide by four shift counter 48. In order to minimize the acquisition time of the doppler modulation signal the tracking filter 46 is provided with a variable bandwidth capability in order to increase the bandwidth when the signal is initially present and for reducing the bandwidth after the filter has stabilized. For this purpose, a time delay circuit 49 is actuated by the leading edge of a squelch controlled DC level which changes state when an audio signal above the preset squelch level is present at the output of the frequency discriminator 36. The time delay circuit 49 increases the bandwith of the tracking filter 49 for a predetermined period after the leading edge of the squelch controlled DC level and then returns the tracking filter 46 to a relatively narrow bandwidth. The doppler signal at the output of the tracking filter 46 is applied to a positive zero crossing detector 50 of conventional design which produces a pulse each time the doppler signal crosses through zero in a predetermined direction. As explained hereinafter, the timing of the pulse with respect to the rotational position of the antenna is an indication of the bearing of the radio transmission since the doppler modulation crosses through zero when the effective velocity of the antenna is perpendicular to the bearing indication, i.e., where the motion of the antenna toward the radio transmission crosses over to motion away from the radio transmission, and where the motion of the antenna away from the radio transmission crosses over to motion toward the radio transmission.

The switching signals for actuating the commutating switches in the filter 46 are generated by a master clock 52 which provides internal timing for the entire direction finding system. The clock 52 operates at a frequency of 360 times the rotation rate of the antenna, and this frequency is divided by a divide by 90 counter 54 before being applied to the divide by four shift counter 48 which generates the actuator pulses for the commutating switches and provides an ANTENNA SYNC pulse for each roation of the antenna. The master clock 52 also provides timing pulses to the display section 56.

The display section 56 provides a visual indication of the phase of the doppler modulation signal with respect to the rotational phase of the antenna. The clock signals from the master clock 52 increment a three digit decade counter 58 which is cleared by the ANTENNA SYNC pulse each time the antenna rotates to a predetermined position. Thus the timing of the ANTENNA SYNC pulse represents a fixed reference bearing to which the timing of the zero crossing pulses from the zero crossing detector 50 is compared to provide an indication of the bearing of the radio transmission. The contents of the counter 58 is selectively read into a display latch 60 by a latch pulse generated by the zero crossing detector 50 each time the doppler modulation signal crosses zero in a predetermined direction. As mentioned earlier, the latch pulse represents an indication of the bearing of the radio transmission. Since the counter 58 is cleared by each ANTENNA SYNC pulse, the count in the counter 58 which is read into the display latch 60 by the latch pulse represents the deviation of the measured bearing from the reference bearing. Since the master clock 52 operates at a frequency which is 360 times the rotation rate of the antenna, the counter 58 increments to 360 during the time that the antenna rotates one revolution. Thus, the count read into the display latch 60 is a direct indication in degrees of the bearing of the radio transmission with respect to a fixed reference. The output of the display latch 60 is processed by a decoder driver 62 which generates the appropriate logic signals to illuminate a three digit decimal display 64 corresponding to the count read into the display latch 60. A latch inhibit signal is provided by the squelch-audio amplifier 38 to prevent the display 64 from displaying rapidly varying random bearings when no signal is present at the output of the frequency discriminator 36 so that the display 64 indicate the bearing of the last signal received.

A schematic of the commutating filter utilized for the variable band with tracking filter 46 in FIG. 2 is illustrated in FIG. 3. Commutating filters are generally well known in the art and their mode of operation is fully described in *Commutating Filter Techniques*, Application Note AN 534 published by Motorola, Inc. The signal at the output of the frequency discriminator 36 (FIG. 2) is applied to a bandpass amplifier 70 which limits the dynamic range of the signal applied to the commutating filter and removes its DC components. The bandwidth of the first commutating filter is determined by the value of resistance 72 and capacitors 74–80. Each of the capacitors 74–80 are sequentially grounded by a switch 82 which is actuated by the actuating pulses from the divide by four shift counter 48 (FIG. 2) which are normally held at a positive potential through resistors 84–90. The output of the commutating filter is applied to the noninverting terminal of an operational amplifier 92 through resistor 94. The gain of the operational amplifier 92 is set by the resistance ratio of resistor 96 to 98.

The output of the amplifier 92 is applied to a second commutating filter having a bandwidth determined by the resistance between the output of the amplifier 92 and the common connection point of capacitors 102–108. This resistance is normally that of variable resistor 110 since switch 112 is normally held at cutoff by the positive voltage applied to resistor 114. However, during the initial portion of a radio transmission determined by the time delay 48 (FIG. 2) the BW CONTROL line goes high thereby saturating transistor 116 through resistor 118 and connecting the input to switch 112 to ground through resistor 120. Switch 112 then places resistor 122 in parallel with resistor 110 so that the bandwidth of the commutating filter is substantially increased until the BW CONTROL line goes low after a predetermined time delay allowing the commutating filter to stabilize. The capacitors 102–108 are selectively grounded by switch 124 which operates in substantially the same manner as switch 82. The output of the second commutating filter stage is applied to a low pass amplifier 126 which removes the higher frequency harmonics generated by the commutating filters. The output of the low pass amplifier 126 is then applied to active filter 128 which implements a complex pole pair and a finite frequency zero pair to produce a combination notch and low pass filter which removes the second harmonics of the commutator filter switching frequency. The output of the filter 128 is the doppler modulation signal with the transmitted audio signal and the modulation signal harmonics reduced to insignificantly small values. The bandwidth of the second commutating filter is also manually adjustable by adjusting the resistance of variable resistor 110.

The bandwidth is adjusted in accordance with the speed at which the bearing varies. Too large a bandwidth doesn't provide sufficient averaging to reject bearing changes induced by periodic motion of the vessel such as by wave action and audio signals passing through the filter along with the doppler signal may reduce system accuracy. As a result the bearing indication tends to change rapidly making readout somewhat difficult. However, where the bearing of the radio transmission is rapidly changing a large bandwidth may be necessary since too small a bandwidth will not allow the filter 46 to follow the changes in phase of the doppler modulation signal responsive to bearing changes.

The modulation signal at the output of the filter 128 is applied to a variable phase shifter 130 which is adjustable by variable resistor 132. The phase shifter 130 calibrates the system by adjusting the timing of the latch pulse at the output of the zero crossing detector 50 (FIG. 2) with respect to the fixed reference point corresponding to the ANTENNA SYNC pulse at the output of the divide by four shift counter 48.

Figure 4:
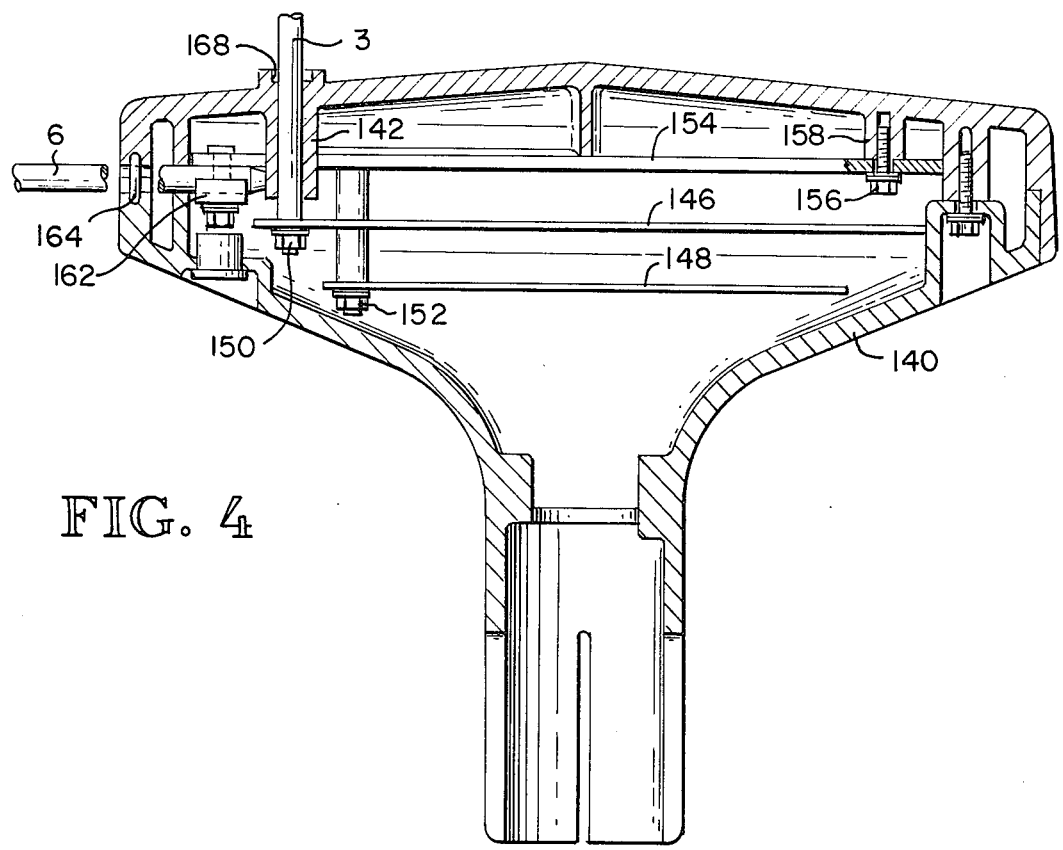
FIG. 4 is a cross sectional view of the base of the antenna array taken along the line 4—4 of FIG. 1.

A cross section of the base housing of the antenna is illustrated in FIG. 4. The antenna base includes a housing 140 including a member of integrally formed bosses 142 having a through bore through which the antenna elements 3 extend. A pair of printed circuit boards 146,148 containing the circuitry for electronically rotating the antenna are secured to the antenna 144 and housing by bolts 150,152, respectively. A ground plane 154 is mounted in the top portion of the antenna body and secured in place by a screw 156 torqued into a hollow boss 158 extending downwardly from the top portion of the antenna base. The ground plane plate 154 supports several ground plane elements 6 which are resiliently secured in place by a spring biased clamp 162. The interior of the housing 140 is sealed from external moisture by O rings 164,168.

In order to allow a relatively small number of antenna elements to simulate a single antenna moving along a circular path, the manner in which the antenna elements are connected to the receiver input is somewhat critical. Furthermore, in order to minimize standing waves, the driving point impedance of the antenna array should be relatively constant. The radio frequency electrical currents and voltages flowing in two or more coupled antenna elements can be expressed by a series of linear simultaneous equations with constant coefficients:

$$E_1 = I_1 Z_{11} + I_2 Z_{12} + \ldots + I_n Z_{1n}$$

$$E_2 = I_1 Z_{21} + I_2 Z_{22} + \ldots + I_n Z_{2n}$$

$$\vdots$$

$$E_m = I_1 Z_{m1} + I_2 Z_{m2} + \ldots I_n Z_{mn}$$

Where $_1, _2, \ldots _n$ represent the voltages generated by the antenna elements, $I_1, I_2, \ldots I_n$ represent the currents at the terminals at the antenna elements 1, 2 ... n, respectively, $Z_{11}, Z_{22} \ldots Z_{nn}$ are the antenna element self impedences, and $Zmn$ ($m$ not equal to $n$) are the mutual impedences between antenna elements. Since the above equations are linear, mathematical superposition must hold. Therefore, the characteristics of two coupled elements may be discussed with no loss of generality. The above equations may then be reduced to the following for two elements:

$$E_1 = I_1 Z_{11} + I_2 Z_{12}$$

$$E_2 = I_1 Z_{21} + I_2 Z_{22}$$

Figure 5:
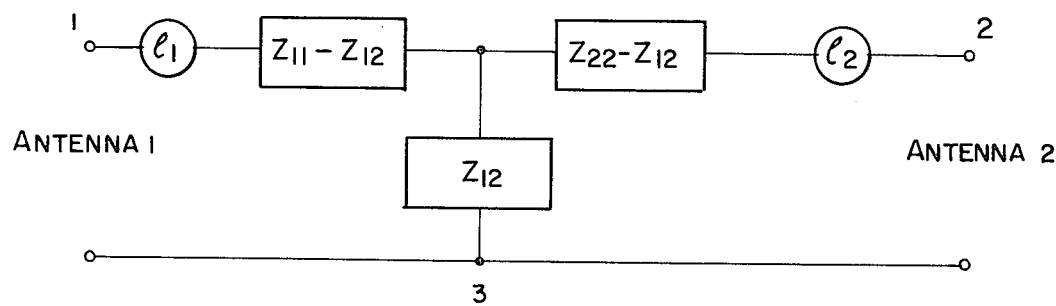
FIG. 5 is a schematic of the equivalent circuit for a pair of the antenna elements in the antenna array of FIG. 1.

When all of the antenna elements are both passive and linear then $Z_{12}$ equal $Z_{21}$. An equivalent circuit for two coupled antenna elements is illustrated in FIG. 5. In the equivalent circuit, $E_1$ and $E_2$ represent an RF signal received by the antenna elements which, for other than near field conditions, are equal in magnitude.

Figure 6:
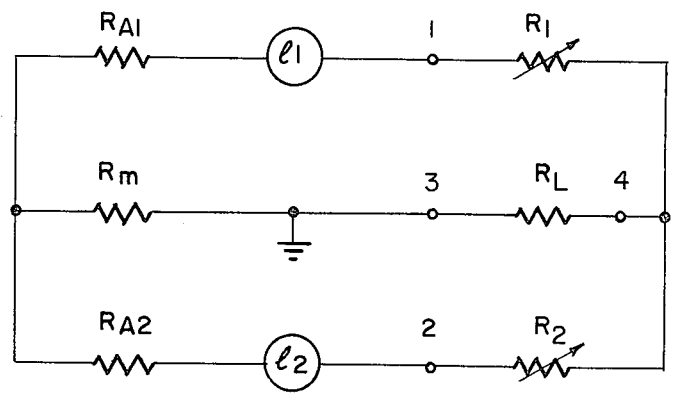
FIG. 6 is a schematic of the equivalent circuit of FIG. 5 with the impedances of FIG. 4 being resistive and the antenna elements connected to a load through variable attenuators.

If the antenna elements are identical, then their self impedances are identical and if they are of resonant length at the operating frequency their self impedances are real (i.e., resistive). If, in addition, they are separated by specific selected distances, their mutual impedance term is also real. An equivalent circuit of the coupled elements in FIG. 5 implementing these conditions is illustrated in FIG. 6. Further, variable resistance attenuator elements $R_1$ and $R_2$ have been placed in series with the terminals of each antenna element and the outputs have been summed into a common load $R_L$. In the equivalent circuit of FIG. 6 $R_{A1} = Z_{11} Z_{12} R_{A2} = Z_{22} Z_{12}$ and $R_m = Z_{12}$. If the resistance of attenuator $R_1$ is varied from a very low value to a very high value with respect to the load $R_L$ and it is desired that the resistance between terminals 3 and 4 (i.e., the resistance seen by the load $R_L$) be held relatively constant by varying $R_2$ to compensate for the change in resistance of $R_1$, the following condition must be satisfied:

$$\frac{1}{R_{A1} + R_1} + \frac{1}{R_{A2} + R_2} = \frac{1}{R_X}$$

Where $R_X$ is a constant. This equation can be rewritten by rearranging the terms to isolate $R_1$ and noting that, by symmetry, $R_1 = R_2 = R_A$:

$$R_1 = \frac{2 R_X R_A + R_2 (R_X - R_A) - R_{2A}}{R_2 + R_A - R_X}$$

If $R_X$ is allowed to equal $R_A$ then the above equation can be simplified as follows:

$$R_1 = R_A^2 / R_2$$

Thus, the assumption that $R_X = R_A$ allows a relatively complex equation to be transformed into a relatively simply formula that can be electrically implemented with relative ease. The physical meaning of this formula is that the resistances $R_1$ and $R_2$ must be inversely proportional, and that the cross over resistance where $R_1$ is equal to $R_2$ must be equal to $R_A$ which, as previously defined, is the difference between the self and mutual resistances of the antenna elements ($R_A = Z_{11} - Z_{12}$).

Figure 7:
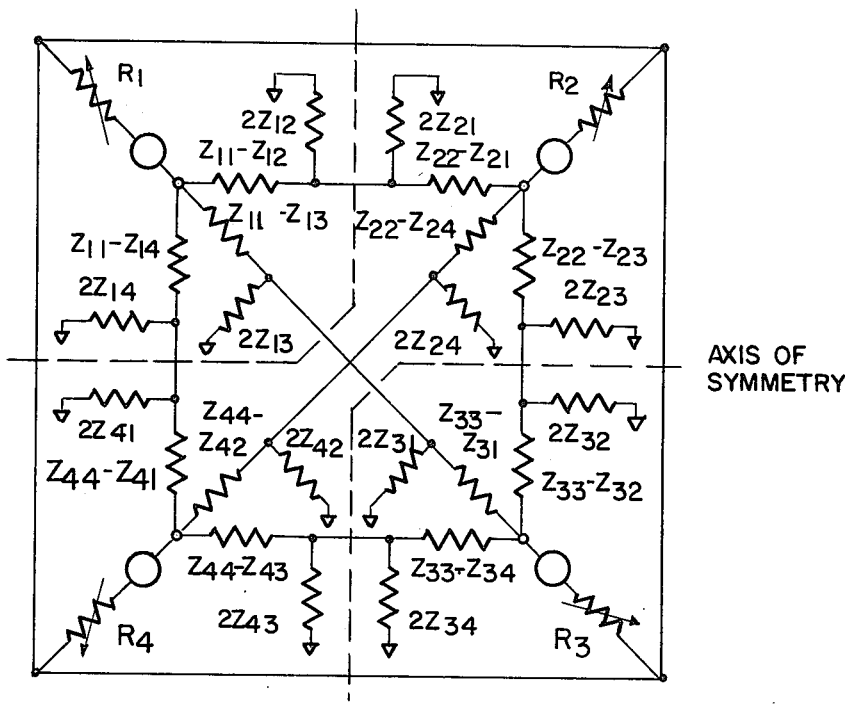
FIG. 7 is a schematic of an equivalent circuit for the antenna array illustrated in FIG. 1 with certain impedances divided into equivalent impedances to allow symmetrical bisection.

As mentioned above, multiple antenna elements can be modeled with a series of simultaneous linear equations with constant coefficients. As equivalent circuit for an antenna array of four antenna elements with certain antenna elements broken into two equivalent elements for symmetry purposes is illustrated in FIG. 7. By application of the bisection theorem the equivalent circuit of FIG. 7 can be broken down into the equivalent circuit illustrated in FIG. 8. By combining like element values and redefining some of the elements as follows:

$$R_{al} = Z_{11} - Z_{13} = Z_{33} - Z_{31}$$

$$R_{M1} = Z_{13} - Z_{31}$$

$$R_{AX} = Z_{11} - Z_{12} = Z_{11} - Z_{14} = Z_{33} - Z_{32} = Z_{33} - Z_{34}$$

$$R_{M2} = Z_{14} = Z_{32} = Z_{34}$$

Figure 8:
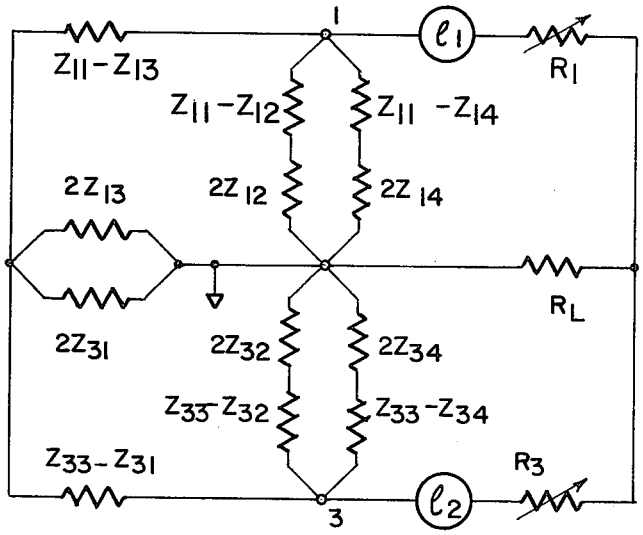
FIG. 8 is a schematic of a symmetrical portion of the circuit of FIG. 7 after bisection.
Figure 9:
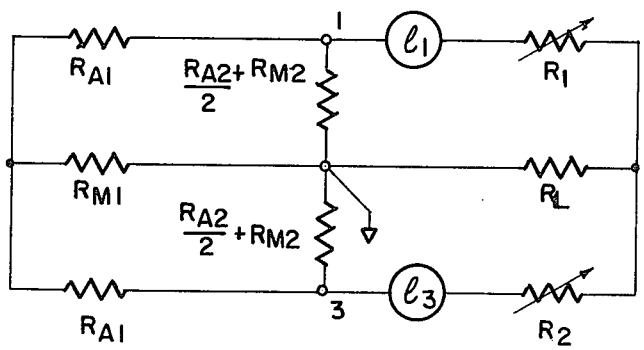
FIG. 9 is a schematic of the equivalent circuit of FIG. 7 after like elements have been combined and the elements have been redefined as resistive elements.

The equivalent circuit of FIG. 8 can be transformed into the equivalent circuit of FIG. 9. Note that for closely spaced antenna elements $R_{M2}$ is much greater than $R_{A1}$. Under these conditions, the network can be closely approximated by the equivalent circuit for the two element antenna array illustrated in FIG. 6.

If attenuators $R_1$ and $R_3$ are varied in such a way that the equation $R_1 = R_A^2 / R_3$ is satisfied, and if resistors $R_2$ and $R_4$ are varied such that the equation $R_2 = R_A^2 / R_4$ is satisfied, then the effective point of received energy can be made to move smoothly from element to element to simulate a single antenna element moving along a circular path.

As mentioned above, the impedance of attenuators $R_1$ and $R_2$ are related to $R_A$ by the expression $R_1 = R_A^2 / R_2$. Since $R_A$ become smaller as the mutual coupling $R_M$ increases, optimum antenna efficiency is obtained when the antenna elements are closely spaced. Close spacing is also required to obtain a nearly circular antenna pattern required for proper operation. With in-phase antenna elements, beam forming effects are minimized as the mutual coupling becomes large. The effect that would occur should the mutual coupling not be a substantial part of the driving point impedance is that the sensitivity of the antenna changes in synchronism with the electronic rotation. This generates undesirable AM side band components on the incoming signal occuring at the rotation rate and its harmonics. Although these harmonics can be removed from the on channel (desired signal) with an FM limiter, if an adjacent channel signal is present it will also be received by the antenna and likewise AM modulated. If the rotation related AM side band harmonics of this signal then fall within the desired channel and are of sufficient amplitude they will cause the effective adjacent channel rejection of the FM receiver to be reduced and, in some cases, render the system inoperable. Therefore, it is desirable that the minimum antenna element spacing at which the mutual term is real be used for optimum antenna performance. A mutual impedance antenna spiral can be used to establish this unique spacing.

Although several difference devices may be used to implement the variable attenuators $R_1$, $R_2$, $R_3$, $R_4$, they may be advantageously implemented using PIN diodes. Since these devices are quite non-linear, they require special care in selectig of the proper drive functions. The resistance of a PIN diode can be expressed as follows:

$$R_1 = K_1 I_{F1}^{-X1}$$

$$R_2 = K_2 I_{F2}^{-X2}$$

which, when combined with the equation $$R_1 = R_A^2/R_2$$

yields the equation $$K_1 I_{F1}^{-X1} = \frac{R_A^2}{K_2 I_{F2}^{-X2}}$$

If the diodes are matched for equal resistance slopes, then $X_1 = X_2$ and the above equation becomes $$I_{F1}^X I_{F2}^X = \frac{R_A^2}{K_1 K_2}$$

since $R_1$, $K_1$, $K_2$ and X are constants, then the product $I_1$ and $I_2$ must also be constant. The diode forward current for a PIN diode can be expressed as follows:

$$I_F = I_s \left( l^{\frac{qV_F}{Kt}} - 1 \right)$$

Where $I_F$ is the diode forward current, $I_s$ is the diode saturation current, $q$ the charge of an electron, $k$ is Boltzman's constant, $T$ is the absolute temperature and degrees kelvin and $V_F$ is the forward diode voltage. The previous two equations can be combined as follows:

$$I_s \left( l^{\frac{qV_F}{kT}} - 1 \right) \left( l^{\frac{qV_F}{kT}} - 1 \right) = I_k$$

At room temperature $q/kT$ is approximately 38 making $qV_F/kT$ quite large. Therefore, $$l^{\frac{qV_{F1}}{kT}} \cdot l^{\frac{qV_{F2}}{kT}} = \frac{I_k}{I_s}$$

Since $\ln(a \cdot b) = \ln a + \ln b$, the above equation can be transformed into the following equation:

$$\frac{qV_{F1}}{kT} + \frac{qV_{F2}}{kT} = \ln \frac{I_k}{I_s}$$

which, when rearranged, yields $$V_{F1} + V_{F2} = \frac{kT}{q} \ln \frac{I_k}{I_s}$$

Since all of the terms on the right side of the equation are constants, it is clear that for the PIN diode implementation of the attenuators that the sum of the diode drive voltages must be constant. In summary, by utilizing PIN diodes as the attenuator elements $R_1$, $R_2$, $R_3$, $R_4$ and maintaining the sum of the drive voltages constant, the effective reception point of the transmitted signal can be made to move along a circular path with the driving point impedance of the antenna array being substantially constant. The above equation can be satisfied by any two symmetrical complementary voltage drive functions, and the requirement for the proper cross over resistance $R_A$ can be implemented by current source biasing. The AC components $C_{F1}$ and $V_{F2}$ can then be added to satisfy the above equation. Two easily generated complementary functions are a sine function, a negative sine function, a cosine function, and a negative cosine function.

Figure 10:
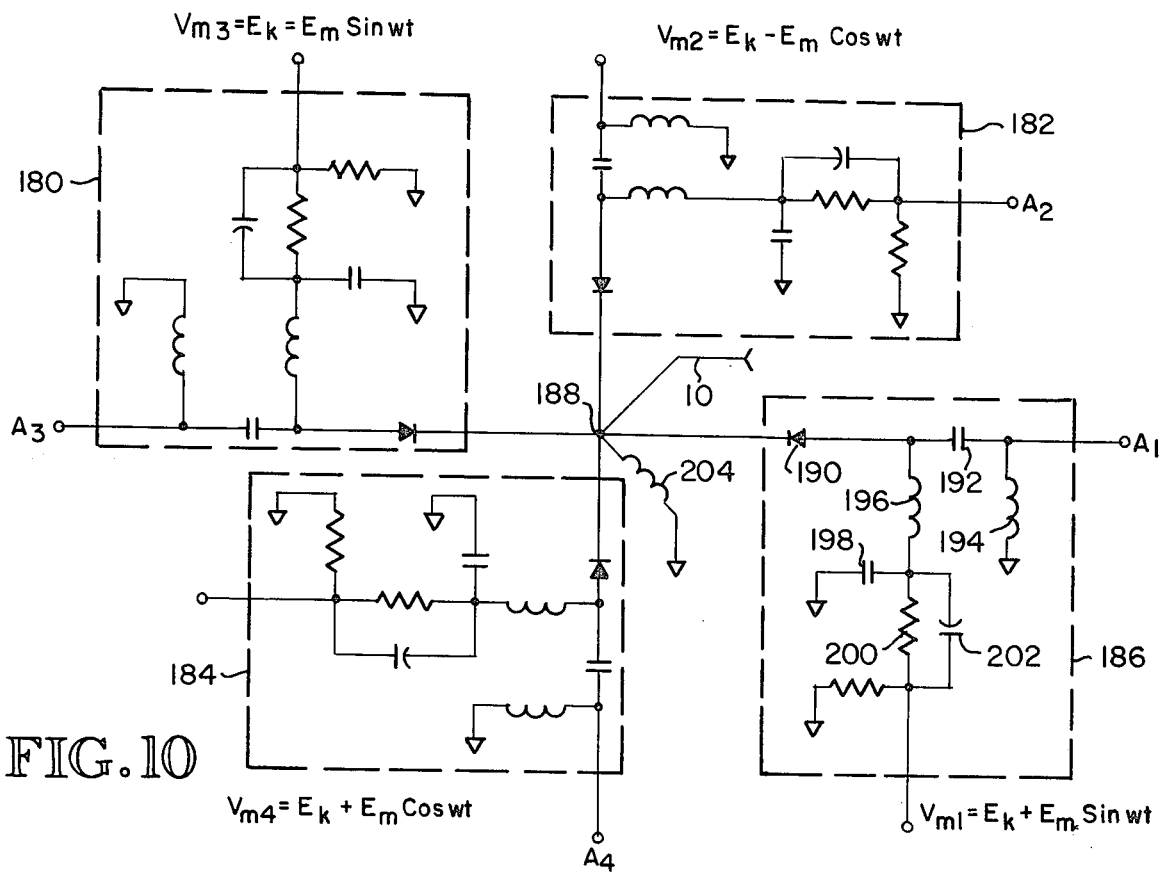
FIG. 10 is a schematic of the variable attenuator circuits utilized in the antenna array of FIG. 1.

An attenuator circuit utilizing PIN diodes and the above described complementary drive functions is illustrated in FIG. 10. Since each of the attenuator circuits 180, 182, 184, 186 are identical, the operation of only one circuit 186 will be explained. All of the attenuator circuits 180–186 are connected to a common antenna output point 188 which is connected to the RF amplifier 12 (FIG. 2) through antenna input line 10. The antenna element $A_1$ (or 3a, FIG. 1) is coupled to the anode of PIN diode 190 through capacitor 192. An RF choke 194 maintains the antenna $A_1$ at ground to prevent static buildup, but it has a very high impedance at RF so that it does not shunt any of the RF energy to ground. The diode modulation signal $E_k + Em\sin\omega t$ is coupled to the anode of PIN diode 190 through another RF choke 196, and the input side of the choke 196 is shunted to ground through bypass capacitor 198. The DC component $E_k$ of the modulation signal $V_{ml}$ is coupled to the anode of PIN diode 190 through resistor 200 while the AC component $E_m \sin\omega t$ passes through a capacitor 202. The attenuator control current flowing through the diode 190 flows out the antenna output line 188 to ground through RF choke 204.

Figure 11:
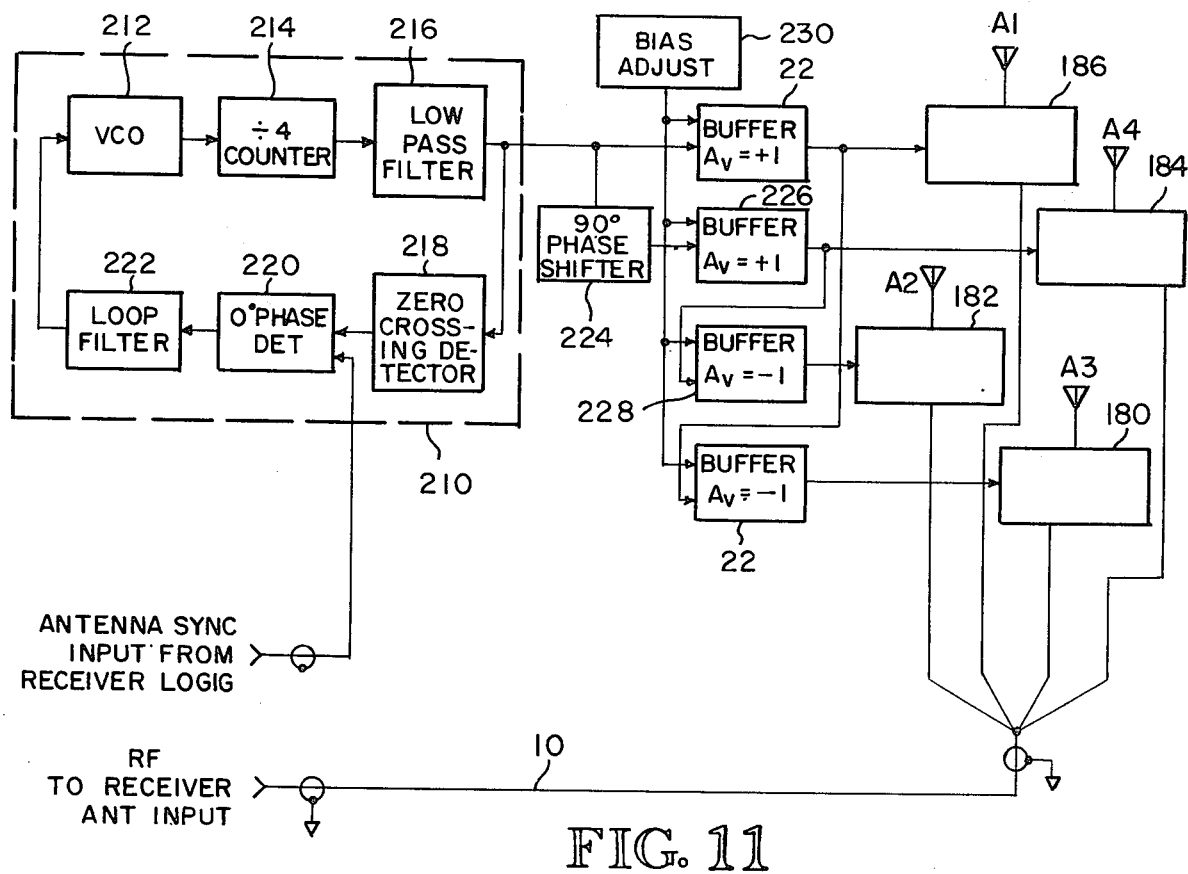
FIG. 11 is a block diagram of the system for electrically rotating the antenna array.

A block diagram for the overall antenna control system is illustrated in FIG. 11. The ANTENNA SYNC pulse from the divide by four shift counter 48 (FIG. 2), which occurs once for each rotation of the antenna, is applied to a phase lock loop 210 which generates a Sine wave at its output having a frequency and phase equal to the frequency and phase of the ANTENNA SYNC pulses. The phase lock loop 210 includes a voltage controlled oscillator 212 which generates an AC signal at its output having a frequency determined by the voltage at its input. The AC signal is reduced in frequency by a divide by four counter 214 to eliminate even harmonics and a low pass filter 216 in order to remove high frequency odd harmonic components of the signal at the output of the VCO 212 so that only the relatively clean fundamental component is present at the output of the low pass filter 216. This output signal is applied to a zero crossing detector 218 which generates a square wave logic signal in phase with the output of the phase lock loop 210. The phase of the square wave at the output of the zero crossing detector 218 is compared with the phase of the ANTENNA SYNC pulse by a zero degree phase detector 220 which produces a voltage proportional to the difference in phase. This voltage, after passing through a loop filter 220 which establishes the loop dynamics, controls the operating frequency of the VCO 212 in a manner which causes the phase of the zero crossing pulses, and hence the phase of the loop output signal, to be equal in phase with the ANTENNA SYNC pulses from the divide by four shift counter 48 (FIG. 2). The output of the phase lock loop 210 is applied to a noninverting buffer 220 which generates a sine function at its output. This sine function modulates series attenuator 186 and is applied to an inverting buffer 222 which generates a negative sine function for the series attenuator 180. The output of the phase lock loop 210 is also phase shifted by a 90° phase shifter 224 to generate a cosine function which, after passing through noninverting buffer 226, is applied to series attenuator 184. The cosine function is also inverted by inverting buffer 228 to control the impedance of series attenuator 182. The DC level of the attenuator control signals is adjusted by a bias adjust circuit 230 in order to adjust the cross over resistance of attenuators 180–186 to equal $R_{14}$ as explained above.

It is important to note that, unlike in conventional doppler antennas, the individual antenna elements are not disconnected from the receiver input during rotation of the antenna. Instead the elements remain connected, and the coupling from the elements to the receiver input are separately and continuously varied to effect antenna rotation. This is in marked contrast to conventional doppler antennas which sequentially switch from one antenna element to the next.

The automatic direction finding system utilizing the doppler principle is thus implemented using a relatively small number of antenna elements. The system provides an accurate indication of the bearing of a radio transmission and preserves the intelligibility of the audio information of the received signal so that it is easily understandable.

The embodiments of the invention in which a particular property or privilege is claimed are defined as follows:

1. An automatic direction finding system for indicating the bearing of a radio transmission, comprising:
    an antenna array including at least three non-unidirectional antenna elements circumferentially spaced along a circular path;
    antenna control means for simultaneously varying the coupling from each of said antenna elements to an antenna output line, said control means being continuously adjustable within a predetermined coupling range in accordance with respective antenna coupling signals such that said antenna array effectively simulates a single antenna element moving along a circular path at a frequency corresponding to the frequency of said coupling signals;
    signal generating means for producing said antenna coupling signals;
    receiver means for extracting a doppler modulation signal from the signal at said antenna output line, said modulation signal having a frequency equal to the frequency of said coupling signals; and
    direction indicating means for comparing the phase of said modulation signal to the phase of a coupling signal and for producing a direction indication signal proportional thereto.

2. The automatic direction finding system of claim 1 wherein said antenna array includes no more than four circumferentially spaced non-unidirectional antenna elements and wherein the antenna coupling signals corresponding to each of said elements are equally phased apart from each other such that the antenna elements in said antenna array accurately simulate a single antenna element moving in a circular path.

3. The automatic direction finding system of claim 1 wherein said antenna control means include electronically controlled, continuously variable attenuator means connecting each of said antenna elements to said antenna output line for controlling the coupling between said antenna elements and said receiver input responsive to respective coupling signals such that the effective reception point of said antenna array moves in a substantially continuous circular path.

4. The automatic direction finding system of claim 3 wherein said coupling signals vary said attenuator means such that the driving point impedance of said antenna array at said receiver input is substantially constant thereby minimizing the standing wave radio of said antenna array.

5. The automatic direction finding system of claim 3 wherein said attenuator means comprise a PIN diode extending between each of said antenna elements and said receiver input, bias means for generating a continuous bias current through said diodes, and diode voltage modulation means for modulating the voltage across said diodes responsive to said coupling signals.

6. The automatic direction finding system of claim 5 wherein the sum of the voltages across all of said diodes is substantially constant such that the driving point impedance of said antenna array is substantially constant.

7. The automatic direction finding system of claim 1 wherein said antenna elements are substantially resonant at the frequency of the received signal such that their self impedances are substantially resistive, and said antenna elements are spaced apart by predetermined distances selected such that their mutual impedances are substantially resistive, the distances between said antenna elements being less than one quarter of a wavelength at the frequency of the radio transmission such that the received signal is not amplitude modulated by electrical rotation of said antenna array.

8. The automatic direction finding system of claim 1 wherein said receiver means include an oscillator-mixer stage followed by an IF filter stage, and wherein the output of said filter stage is locked to a fixed reference frequency for controlling the frequency of the oscillator in said oscillator-mixer stage thereby stabilizing the time delay of the received signal passing through said oscillator-mixer and IF filter stages.

9. The automatic direction finding system of claim 1 wherein said receiver means include a frequency discriminator for generating a voltage proportional to the frequency of the signal on said antenna output line, and commutating filter means connected to the output of said frequency discriminator for extracting said doppler modulation signal.

10. The automatic direction finding system of claim 9 wherein said commutating filter means include a plurality of commutator switches sequentially actuated by one of said coupling signals such that the operating frequency of said commutating filter is identical to the frequency of said doppler modulation signal.

11. The automatic direction finding system of claim 9 wherein said commutating filter means further include acquisition means for detecting the initial portion of a radio transmission and for increasing the bandwidth of said commutating filter means for a predetermined period in response thereto such that said commutating filter means is rapidly stabilized.

12. The automatic direction finding system of claim 1 wherein said direction indicating means comprise:
oscillator means for generating a fixed frequency clock signal;
synchronization means for generating a SYNC pulse when the effective reception point of said antenna array is at a predetermined position corresponding to a fixed reference bearing;
counter means incremented by said clock signal, said counter means for clearing said counter responsive to said SYNC pulse such that said counter initiates counting when the effective reception point of said antenna array coincides with said reference bearing;
zero crossing detector means receiving said modulation signal for generating a latch pulse for each transition of said modulation signal through zero in a predetermined direction when the effective reception point of said antenna array is at a point corresponding to the bearing of said radio transmission;
display latch means receiving the output of said counter means for displaying the count in said counter means responsive to said latch pulses such that the count display by said display latch means corresponds to the time interval during which the effective reception point of said antenna array moves from a point corresponding to said reference bearing to a point corresponding to the bearing of said radio transmission.

13. The automatic direction finding system of claim 1 wherein said receiver means include an audio channel for extracting an audio signal from the received signal and for generating an audible sound responsive thereto, said receiver means further including notch filter means for removing said modulation signal from said audio signal such that said modulation signal does not substantially degrade the audio quality of said audio signal.

14. An automatic direction finding system for indicating the bearing of a radio transmission, comprising:
an electrically rotatable antenna array including at least three non-unidirectional antenna elements circumferentially spaced along a circular path, said antenna elements being connected to a common antenna output line by variable attenuator means continuously adjustable over a predetermined range responsive to respective antenna control signals;
mixer means for generating a mixer output signal having a frequency corresponding to the frequency difference between the signal on said antenna output line and an oscillator signal;
IF filter means receiving said mixer output signal and attenuating components of said mixer output signal falling outside said predetermined IF filter passband to produce an IF filter output signal;
phase detector means for generating an oscillator control signal corresponding to the phase difference between a reference signal having a predetermined frequency and a signal corresponding to said mixer output signal;
oscillator means for generating said oscillator signal, said oscillator means being manually adjustable over a relatively wide frequency range and being automatically adjustable over a relatively narrow frequency range responsive to said oscillator control signal, said oscillator means and phase detector means forming a phase lock loop to stabilize the time delay of the signal passing through IF filter means;
frequency discriminator means for generating a voltage corresponding to the frequency of said IF filter output signal;
means for generating said antenna control signals for adjusting said variable attenuator means, said control signals being identical in frequency and different in phase such that said antenna array simulates a single antenna element moving along a continuous circular path.
commutating a filter means including a plurality of commutator switches sequentially actuated responsive to a signal having a frequency equal to the frequency of said antenna control signals such that said commutating filter means has a passband equal in frequency to the frequency of the dopper modulation injected onto the received signal by electrically rotating said antenna array; and
bearing indication means for producing a bearing indication corresponding to the difference in phase between said doppler modulation and one of said antenna control signals.

15. The automatic direction finding system of claim 14 wherein said attenuator means comprise a PIN diode extending between each of said antenna elements and said antenna output line, bias means for generating a continuous bias current through said diodes, and diode voltage modulation means for modulating the voltage across said diodes responsive to said coupling signals, the sum of the voltages across all of said diodes being substantially constant such that the driving point impedance of said antenna array is substantially constant.

16. An electrically rotatable antenna array comprising at least three antenna elements circumferentially spaced along a circular path, said antenna elements being connected to a common antenna output line by variable attenuator means continuously adjustable over a predetermined range responsive to respective antenna control signals such that identical frequency, differing phase antenna control signals cause the effective reception point of said antenna array to move along a continuous circular path.

17. The antenna array of claim 16 wherein said antenna array includes four equally spaced non-unidirectional antenna elements, and said antenna control signals are 90 degrees apart from each other.

18. The antenna array of claim 16 wherein said attenuator means comprise a PIN diode extending between each of said antenna elements and said antenna output line, bias means for generating a continuous bias current through said diodes, and diode voltage modulation means for modulating the voltage across said diodes responsive to said coupling signals, the sum of the voltages across all of said diodes being substantially constant such that the driving point impedence of said antenna array is substantially constant.

19. In a doppler automatic direction finding system including an antenna rotating at a frequency corresponding to an antenna control signal thereby injecting a doppler modulation signal on the received signal, and a frequency modulation receiver having a frequency discriminator for generating a voltage corresponding to the frequency of the received signal, the improvement comprising commutating filter means for extracting said doppler modulation signal from the signal at the output of said frequency discriminator, said commutating filter means including a plurality of commutator switches sequentially actuated at a frequency corresponding to the frequency of said antenna control signals such that said commutating filter means has a relatively narrow passband having a center frequency equal to the frequency of said doppler modulation signal.

20. The automatic direction finding system of claim 19 wherein said commutating filter means further includes acquisition means for detecting the initial portion of a radio transmission, and for increasing the bandwidth of said commutating filter means for a predetermined period in response thereto such that said commutating filter means is rapidly stabilized.

21. In a doppler automatic direction finding system having a mixer stage for generating an output signal having a frequency corresponding to the frequency difference between the signal on a receiver input line and an oscillator signal followed by an IF filter stage for attenuating components of the output signal from the mixer falling outside of a predetermined IF filter passband to produce an IF filter output signal, the improvement comprising phase lock loop means for stabilizing the time delay of an input signal passing through said IF filter stage, comprising:

reference oscillator means for generating a fixed frequency reference signal;

phase detector means for generating an oscillator control signal corresponding to the phase difference between said reference signal and a signal corresponding to the signal at the output of said IF filter stage;

oscillator means for generating said oscillator signal, said oscillator means being manually adjustable over a relatively wide frequency range and being automatically adjustable over a relatively narrow frequency responsive to said oscillator control signal, said oscillator means and phase detector means forming a phase lock loop to stabilize the time delay of the signal passing through said IF filter stage.

* * * * *

UNITED STATES PATENT OFFICE
CERTIFICATE OF CORRECTION

Patent No. 4,041,496  Dated August 9, 1977

Inventor(s) Paul R. Norris

It is certified that error appears in the above-identified patent and that said Letters Patent are hereby corrected as shown below:

In [56] References Cited add the following references: 2,994,082, Steiner; 3,047,864, Byatt; 3,453,627, Lode; 3,797,013 Shestag, et al; 3,806,932, Dietrich, et al.

Column 3, line 5 "with" should read --without--.

Column 9, line 60 the formula reading $R_{A1} = Z_{11} Z_{12} R_{A2} = Z_{22} Z_{12}$ should be $R_{A1} = Z_{11} - Z_{12} \quad R_{A2} = Z_{22} - Z_{12}$ Column 10, line 28, "As" should read -- An --.

Column 10, line 44, the portion of the formula reading $R_{M2} = Z_{14}$ should read $R_{M2} = Z_{12} = Z_{14}$ line 40, formula reading $K_1 I_{F1}{}^{X_1} = \dfrac{R_A^2}{K_2 I_{F_2}^{-X_2}}$ should read $K_1 I_{F1}^{-X_1} = \dfrac{R_A^2}{K_2 I_{F2}^{-X_2}}$ line 43, formula $X_1 = X_2$ should read $X_1 = X_2 = X$ line 46, formula $I_{F1}{}^X K_{F2}{}^X = \dfrac{R_A^2}{K_1 K_Z}$ should read $I_{F1}^{-X} I_{F2}^{-X} = \dfrac{R_A^2}{K_1 K_2}$

UNITED STATES PATENT OFFICE
CERTIFICATE OF CORRECTION

Patent No. 4,041,496  Dated August 9, 1977

Inventor(s) Paul R. Norris

It is certified that error appears in the above-identified patent and that said Letters Patent are hereby corrected as shown below:

The formula on column 11, line 54 reading $$I_F = I, \left(1\frac{qV_F}{Kt} - 1\right)$$ should read $$I_F = I_s \left(e^{\frac{qV_F}{kT}} - 1\right)$$

line 65, formula reading $$I_s^2 \left(1\frac{qV_F}{kT} - 1\right)\left(1\frac{qV_F}{kT} - 1\right) = 1_k$$

should read $$I_s^2 \left(e^{\frac{qV_{F1}}{kT}} - 1\right)\left(e^{\frac{qV_{F2}}{kT}} - 1\right) = I_K$$

Signed and Sealed this

Seventh Day of November 1978

[SEAL]

Attest:

RUTH C. MASON  
Attesting Officer

DONALD W. BANNER  
Commissioner of Patents and Trademarks